June 18, 1946.    S. TERPAK ET AL    2,402,466
BUSHING FOR ELECTRICAL APPARATUS
Filed May 20, 1942
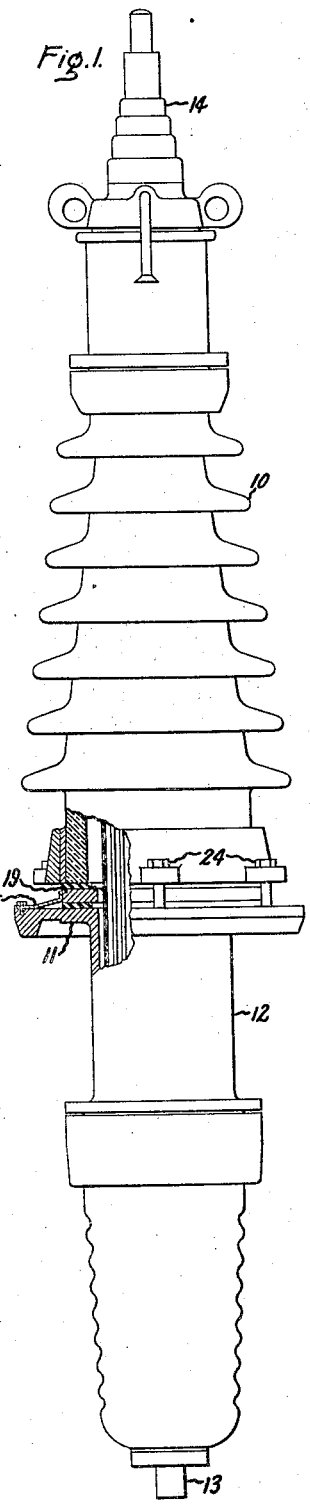
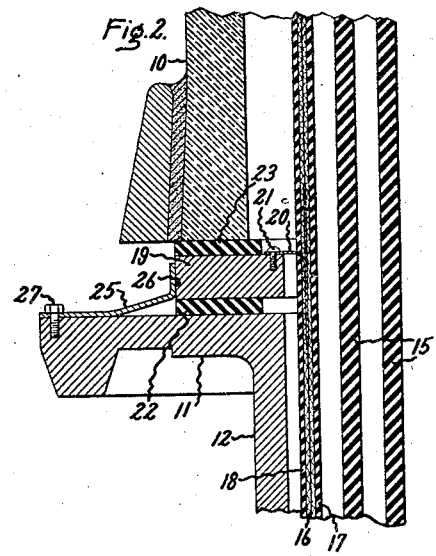
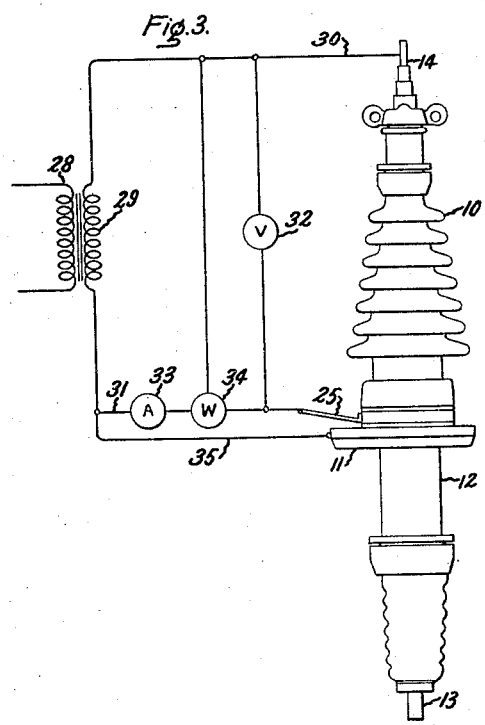
Inventors:
Stephen Terpak,
Lynn Wetherill,
by Harry E. Dunham
Their Attorney Patented June 18, 1946

2,402,466

UNITED STATES PATENT OFFICE 2,402,466

BUSHING FOR ELECTRICAL APPARATUS

Stephen Terpak and Lynn Wetherill, Pittsfield, Mass., assignors to General Electric Company, a corporation of New York Application May 20, 1942, Serial No. 443,696

1 Claim. (Cl. 175—183)

Our invention relates to bushings for electrical apparatus and to bushings for insulating the leads of such electrical apparatus as transformers and circuit breakers.

It is customary to provide a bushing for electrical apparatus including a shell of insulating material such as porcelain through which extends a stud for connection with the windings of the electric apparatus. A supporting flange is provided upon which the porcelain shell is mounted, the flange usually having a tubular portion extending into the tank of the apparatus and through which the electrical conducting stud extends. An insulating arrangement in the form of concentric tubular cylinders is provided around the stud and inside the shell and flange member. It is desirable with bushings of this general construction to test from time to time during their operation the quality of the insulation of the bushing, such testing operation usually involving a power factor test. This may be accomplished by impressing a potential between the inner conducting stud and the ground shield, and with a given potential and measuring the current and watts, the loss may be easily determined. In order, however, not to include the losses in the apparatus windings to which the stud is connected, it has been customary with some bushing constructions to disconnect the inner end of the stud from the apparatus windings during the power factor test. When the apparatus is of a hermetically sealed construction, it will be seen that it is a considerable inconvenience to remove the cover, open the apparatus inside the casing to the air, and disconnect the inner end of the stud from the windings.

It is, therefore, an object of our invention to provide an improved bushing construction on which a power factor test may be made without disconnecting the stud of the bushing from windings of the apparatus with which the bushing is employed.

Another object of our invention is to provide a bushing of the above-mentioned type which is efficient in operation and simple to manufacture.

Further objects and advantages of our invention will become apparent from the following description referring to the accompanying drawing, and the features of novelty which characterize our invention will be pointed out with particularity in the claim annexed to and forming a part of this specification.

In the drawing:

Fig. 1 is a side view in partial section of a bushing for an electrical apparatus which is provided with an embodiment of our invention; Fig. 2 is a sectional side elevation of a portion of the bushing construction illustrated in Fig. 1, showing the arrangement of parts during normal operation, and Fig. 3 is a side view of the bushing construction of Fig. 1 and diagrammatically showing a power factor testing equipment connected to the bushing construction.

In the arrangements illustrated in the drawing, we have shown our invention as applied to a bushing construction including the conventional insulating shell and supporting flange through which a conducting stud extends. A suitable insulating arrangement is provided around the conducting stud and inside the shell and mounting flange, and a shield is provided around the insulating structure inside the shell and spaced from the supporting flange which when connected to the apparatus casing will be at ground potential. In order to provide an improved arrangement for power factor testing of the bushing, we provide an arrangement for connecting the shield to ground potential through the supporting flange during normal operation and which connection may be removed and a connection made from the shield to the power factor testing equipment when it is desired to make the test. This connecting arrangement includes a conducting ring between the shell and the supporting flange, the ring being electrically connected to the shield and insulated from the supporting flange. A conducting strap is provided connected to the ring, and the strap during normal operation may be attached to the flange for grounding the shield, the strap being adapted to be removed from this connection and connected to the testing equipment during the power factor measuring operation.

Referring more particularly to Fig. 1 of the drawing it will be seen that we have provided a bushing construction which includes a shell 10 of any suitable material such as porcelain and a supporting flange 11 which is axially disposed with respect to the shell 10, the flange being adapted to be mounted on the casing of the apparatus with which the bushing is employed. The flange 11 includes a tubular portion 12, and a stud 13 extends through the shell and supporting flange, the lower end of the stud being adapted to be connected to windings of an apparatus. A terminal 14 is provided at the opposite end of the bushing for making connection between the stud and a suitable electric circuit. Surrounding the conducting member or stud is provided a suitable insulating arrangement such as a plurality of cylinders 15 which may be made of any suitable insulating material. These cylinders 15 surround the stud and are spaced from each other and the inner periphery of the shell 10 and flange 11. An insulating fluid such as oil may be provided within the bushing. A shield 16 of suitable conducting material is provided which surrounds the insulating cylinders 15 and which is also spaced from the inner periphery of the shell 10 and flange 11. This shield may be formed in any suitable manner such as by providing an insulating cylinder 17 with a coating of conducting material, such as carbon or conducting particles. Another insulating cylinder 18 may be placed around the sheath, if desired.

In order to provide an arrangement for connecting the shield 16 to ground potential during normal operation and for connecting the shield to the measuring apparatus during power factor testing, we provide a ring member 19 which is connected to the shield 16 in any suitable manner such as through a conducting member 20. The member 20 may be electrically connected to the shield 16 in any suitable manner such as by soldering, and the member 20 is connected to the ring 19 through a bolt 21. The ring 19, it will be seen, has a diameter approximately the same as that of the tubular portion of the supporting flange 11 and the ring 19 is placed between adjacent ends of the shell 10 and supporting flange 11. A gasket 22 of suitable insulating material is provided between the ring and the adjacent surface of the flange. A similar gasket 23 is also provided between the ring and the shell. Through a clamping arrangement including bolts 24, it will be seen, that the ring and adjacent gaskets, upon tightening of the bolts 24, will make a relatively fluid tight connection between the adjacent ends of the shell 10 and the flange 11.

A strap 25 is provided which is electrically connected to the ring 19 in any suitable manner such as by soldering as indicated by the numeral 26. During normal operation of the bushing construction when it is desirable to connect the shield 16 at ground potential, the strap 25 is connected to the flange 11 in any suitable manner, such as through a bolt 27.

When it is desired to make a power factor test of the bushing insulation including the cylinders 15, the terminal 14 may be disconnected from the electric circuit and the strap 25 disconnected from the clamping flange 11 and then bent upwardly away from the flange, as is illustrated by the position of the strap 25 in Fig. 3. A potential may be impressed across the insulation including the cylinders 15 in any suitable manner, such as by employing any suitable power factor measuring and testing equipment. Such an equipment is diagrammatically shown in Fig. 3 and includes a transformer having a primary winding 28 which is adapted to be connected to a suitable source of potential and a secondary winding 29, one end of which may be connected to the terminal 14 through the conductor 30, the opposite end being adapted to be connected to the strap 25 through the conductor 31. The voltage applied across the insulation may be measured by any suitable meter indicated by the numeral 32 which is connected across the wires 30 and 31, and the current flowing through the insulation and the watts loss may be measured with the instruments indicated by the numerals 33 and 34, respectively. Another conductor 35 is connected between the conductor 31 and the supporting flange 11 so that the current during testing which passes through the apparatus windings will be by-passed around the instruments which are measuring the losses in the insulation.

In view of the foregoing it will be seen that we have provided a conventional bushing with an improved structure for facilitating the power factor testing of the bushing without going to the trouble of disconnecting the inner end of the stud from the apparatus windings. Thus by removably connecting the shield with ground potential through our improved structure including the ring, the conducting shield which surrounds the insulation may be connected at ground potential during normal operation and removed from ground potential and connected to the testing equipment when it is desired to make power factor testing.

Although we have shown and described a particular embodiment of our invention, we do not desire to be limited to the particular embodiment described, and we intend in the appended claim to cover all modifications which do not depart from the spirit and scope of our invention.

What we claim as new and desire to secure by Letters Patent of the United States is:

A bushing for electrical apparatus including a shell of insulating material, a supporting flange axially disposed with respect to said shell, a conductor extending through said shell and said flange, insulating means between said conductor and said surrounding shell and flange, a conducting shield surrounding and supported by said insulating means and spaced from said flange, a conducting ring between adjacent surfaces of said shell and flange and electrically connected with said shield, means insulating said ring from said flange, and removable strap means for electrically connecting said ring to said flange during normal operation of said bushing and for connecting said ring to a testing apparatus for measuring the quality of said insulating means.

STEPHEN TERPAK.
LYNN WETHERILL.